United States Patent

Ayuba et al.

(10) Patent No.: US 11,561,787 B2
(45) Date of Patent: Jan. 24, 2023

(54) APPLICATION INVOCATION ON SPECIFIED OPERATING SYSTEM VERSION

(71) Applicant: International Business Machines Corporation, Armonk, NY (US)

(72) Inventors: Sho Ayuba, Tokyo (JP); Mayumi Goto, Ayase (JP); Timothy Waileong Koh, Tokyo (JP); Nobuyuki Yoshifuji, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/319,162

(22) Filed: May 13, 2021

(65) Prior Publication Data
US 2022/0365765 A1   Nov. 17, 2022

(51) Int. Cl.
*G06F 8/65* (2018.01)
*G06F 9/4401* (2018.01)
*G06F 8/71* (2018.01)

(52) U.S. Cl.
CPC .............. *G06F 8/65* (2013.01); *G06F 8/71* (2013.01); *G06F 9/4406* (2013.01)

(58) Field of Classification Search
CPC .......... G06F 9/45558; G06F 8/65; G06F 8/71; G06F 9/45533; G06F 9/4406
See application file for complete search history.

(56) References Cited

U.S. PATENT DOCUMENTS

| | | | |
|---|---|---|---|
| 9,003,173 B2 | 4/2015 | Baribault et al. | |
| 10,025,580 B2 | 7/2018 | Paul et al. | |
| 10,860,303 B2 | 12/2020 | Sirois et al. | |
| 2005/0021917 A1* | 1/2005 | Mathur | G06F 9/44594 711/159 |
| 2005/0149447 A1* | 7/2005 | Sherkow | G06Q 10/00 705/52 |
| 2008/0256564 A1* | 10/2008 | Fathalla | G06F 9/45537 719/331 |
| 2009/0089569 A1 | 4/2009 | Baribault et al. | |
| 2009/0300510 A1 | 12/2009 | Gantman et al. | |

(Continued)

FOREIGN PATENT DOCUMENTS

| | | |
|---|---|---|
| JP | 2012529437 A | 11/2012 |
| WO | 2012023190 A1 | 2/2012 |

OTHER PUBLICATIONS

J. Bradley Chen et al.; The Impact of Operating System Structure on Memory System Performance; ACM; pp. 120-133; retrieved on Sep. 28, 2022 (Year: 1993).*

(Continued)

*Primary Examiner* — S. Sough
*Assistant Examiner* — Cuong V Luu
(74) *Attorney, Agent, or Firm* — Stosch Sabo

(57) ABSTRACT

A computer-implemented method that includes determining that a first version of an operating system (OS) is updated to a second version of the OS. The method further includes determining that an application does not support the second version of the OS. The method further includes associating the first version of the OS with the application as a base OS. The method further includes invoking the application on the base OS by generating an isolated instance running the base OS on a user device, where the user device simultaneously runs the second version of the OS.

18 Claims, 11 Drawing Sheets

(56) References Cited

U.S. PATENT DOCUMENTS

| | | | |
|---|---|---|---|
| 2011/0067105 A1* | 3/2011 | Wolfe | G06F 11/3072 |
| | | | 726/23 |
| 2011/0321025 A1* | 12/2011 | Challa | G06F 8/65 |
| | | | 717/169 |
| 2012/0227061 A1* | 9/2012 | Hunt | G06F 8/71 |
| | | | 719/331 |
| 2014/0208302 A1* | 7/2014 | Paul | G06F 8/65 |
| | | | 717/170 |
| 2016/0162286 A1 | 6/2016 | Bankole et al. | |
| 2020/0341749 A1 | 10/2020 | Bashi et al. | |
| 2021/0168027 A1* | 6/2021 | Parulkar | H04L 67/1097 |
| 2022/0114238 A1* | 4/2022 | Padmanabhan | G06F 21/12 |

OTHER PUBLICATIONS

Benjamin Wester et al.; Operating System Support for Application—Specific Speculation; ACM; pp. 229-242; retrieved on Sep. 28, 2022 (Year: 2011).*

Unknown, "How remote desktop works", Apr. 7, 2020, 2 pages <https://milestone-of-se.nesuke.com/sv-basic/windows-basic/remote-desktop-security/>.

Unknown, "Embedded Blog", Nov. 23, 2019, 4 pages <https://blog.goo.ne.jp/yoossh/e/10fa6e6ee04bb27df467db671304071f>.

Fingas, J., "Multiple OS a patent for multi-boot to use in the same mobile terminal Microsoft acquisition", printed May 13, 2021, 2 pages <https://gigazine.net/news/20150410-microsoft-patents-multi-os-boot/>.

Mell et al., "The NIST Definition of Cloud Computing", Recommendations of the National Institute of Standards and Technology, Sep. 2011, 7 pages.

* cited by examiner

110A

| BASE OS VERSION | APPLICATIONS |
|---|---|
| 1.9 (LATEST) | APP1, APP2, APP3, APP5 |
| 1.8 | APP 4 |

| BASE OS VERSION | APPLICATIONS |
|---|---|
| 2.0 (LATEST) | APP2, APP5 |
| 1.9 | APP1, APP3 |
| 1.8 | APP4 |

| BASE OS VERSION | APPLICATIONS |
|---|---|
| 2.0 (LATEST) | APP2-3, APP5-1 |
| 1.9 | APP1-1, APP2-1, APP3-1, APP5-2 |
| 1.8 | APP1-2, APP2-2, APP3-2, APP4-1, APP5-3 |

FIG. 2C

APPLICATION INVOCATION ON SPECIFIED OPERATING SYSTEM VERSION

BACKGROUND

The present disclosure relates to application management, and, more specifically, to application invocation on a specified operating system (OS) version.

An OS is a software package that supports a computational system's basic functions such as, but not limited to, scheduling tasks, executing applications, and controlling peripherals. OS updates can be applied to the OS of computational systems to upgrade functionality, improve security, increase efficiency, and/or achieve other purposes. However, OS version updates can introduce incompatibilities with applications not configured for an updated OS.

SUMMARY

Aspects of the present disclosure are directed toward a computer-implemented method comprising determining that a first version of an operating system (OS) is updated to a second version of the OS. The method further comprises determining that an application does not support the second version of the OS. The method further comprises associating the first version of the OS with the application as a base OS. The method further comprises invoking the application on the base OS by generating an isolated instance running the base OS on a user device, where the user device simultaneously runs the second version of the OS.

Additional aspects of the present disclosure are directed toward a computer-implemented method comprising retrieving, based on an instruction to execute a first application on a user device, a preferred version of a first operating system (OS) for the first application from an application base OS table, where the user device executes a first version of the first OS. The method further comprises generating an isolated instance of the preferred version of the first OS on the user device. The method further comprises executing the first application on the isolated instance of the preferred version of the first OS on the user device.

Additional aspects of the present disclosure are directed to systems and computer program products configured to perform the methods described above.

Additional aspects of the present disclosure are directed toward a system comprising a user device comprising hardware executing software on a first operating system (OS). The system further comprises a first isolated instantiation of a second OS, where the first isolated instantiation of the second OS invokes a first application, where the first application does not function on the first OS. The system further comprises a second isolated instantiation of a third OS, where the second isolated instantiation of the third OS invokes a second application, where the second application realizes an improved efficiency on the third OS than the first OS.

The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 2A illustrates an example application base OS table including two versions of an OS, in accordance with some embodiments of the present disclosure.

FIG. 2B illustrates an example application base OS table including three versions of an OS, in accordance with some embodiments of the present disclosure.

FIG. 2C illustrates an example application base OS table where applications are ranked by preferred version of OS, in accordance with some embodiments of the present disclosure.

Figure 1A:
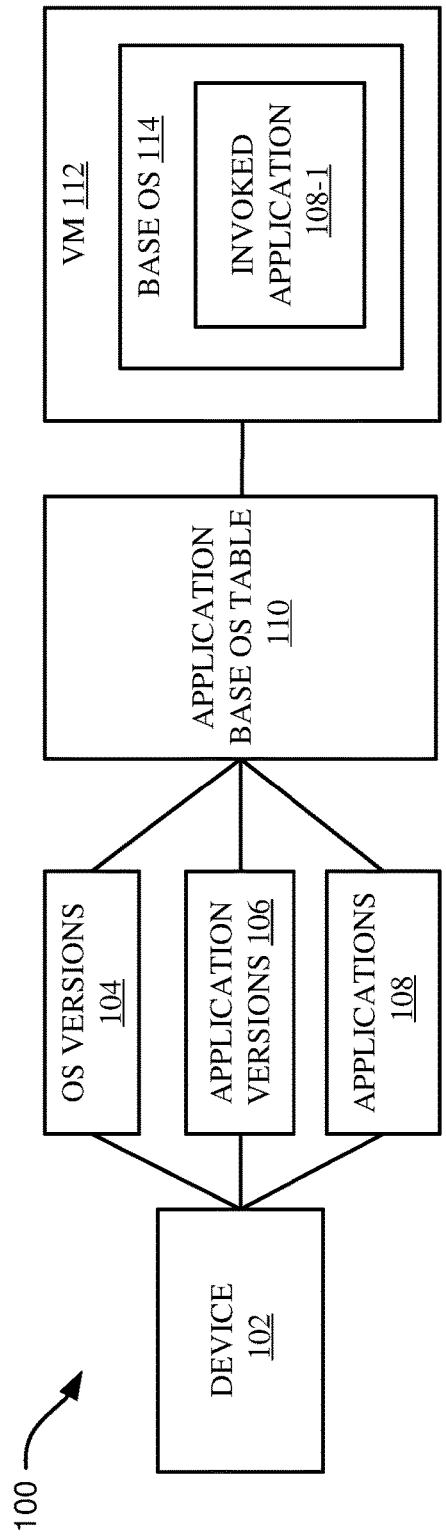
FIG. 1A illustrates a block diagram of a first example computational environment where an application is invoked on a predetermined OS of a virtual machine (VM), in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward application management, and, more specifically, to application invocation on a specified operating system (OS) version. While not limited to such applications, embodiments of the present disclosure may be better understood in light of the aforementioned context.

FIG. 1A illustrates a block diagram of a first example computational environment 100 where an application is invoked on a predetermined OS of a virtual machine (VM), in accordance with some embodiments of the present disclosure. The first example computational environment 100 includes a device 102. The device 102 can be any user device such as, but not limited to, a smartphone, a tablet, a laptop, or any other user device. The device 102 can store, or be communicatively coupled to one or more electronic devices storing, OS versions 104, application versions 106, and applications 108. OS versions 104 can refer to various versions of an OS. In some embodiments, OS versions 104 can refer to different types of OS and/or different versions of different types of OS. Application versions 106 can refer to various versions of various applications 108. Applications 108 can be software configured to execute on hardware of the device 102.

All or some of the data of OS versions 104, application versions 106, and applications 108 can be used to populate application base OS table 110. Application base OS table 110 can store relationships between applications 108 and OS versions 104 (e.g., which applications 108 are compatible with which OS versions 104). In some embodiments, application base OS table 110 stores relationships between application versions 106 and OS versions 104 (e.g., which versions of applications 108 are compatible with which versions of the OS).

Some different applications 108 (or application versions 106 of applications 108) may be unsuitable for different OS versions 104. For example, an updated version of an OS may include functionality that causes an error or other malfunction in a given application 108. Once a new application version 106 of the malfunctioning application 108 is released and installed, the updated application version 106 of the subject application 108 may again be compatible with the updated OS version 104 of the OS. Accordingly, aspects of the present disclosure overcome the problems caused by applications 108 that are incompatible with a newly released version of an OS.

Furthermore, in some situations, applications 108 may be compatible with numerous OS versions 104, but respective applications 108 can exhibit improved performance with specific OS versions 104 relative to other OS versions 104. In these situations, application base OS table 110 can rank OS versions 104 for respective applications 108. Application base OS table 110 is discussed in more detail hereinafter with respect to FIGS. 2A-2C.

The information contained in application base OS table 110 can be used to generate a virtual machine (VM) 112 instantiating an isolated instance of a base OS 114 for a given invoked application 108-1. The base OS 114 can be a preferred OS version 104 for the invoked application 108-1 according to the application base OS table 110. The base OS 114 can be an OS version 104 that is compatible with the invoked application 108-1. In some embodiments, the base OS 114 can be an OS version 104 that exhibits improved efficiencies for the invoked application 108-1 relative to other OS versions 104 (e.g., decreased boot time, decreased memory occupancy, etc.). In some embodiments, the base OS 114 is a different OS version 104 than an OS executed by the device 102. In other words, VM 112 can create a dedicated environment using the base OS 114 for the invoked application 108-1 that is isolated from other applications executing on device 102 (which can be using an OS version 104 different from the base OS 114).

The VM 112 can be instantiated using computational resources contained within device 102 or computational resources communicatively coupled to the device 102 (e.g., provisioned to the device 102 over a network). As used herein, VMs can refer to virtualization and/or emulations of one or more computational components. VMs can include process virtual machines (e.g., application virtual machines, Managed Runtime Environments (MREs), etc.) or system virtual machines. In some embodiments, VMs can be orchestrated by a hypervisor while in other embodiments, a hypervisor may not be necessary such as in an operating system level virtualization.

As shown in FIG. 1A, the device 102 is permanently, semi-permanently, or intermittently communicatively coupled to OS versions 104, application versions 106, applications 108, application base OS table 110, VM 112, base OS 114, and invoked application 108-1. In some embodiments, the device 102 contains each of the aforementioned components. In other embodiments, one or more of the aforementioned components are contained in device 102 and one or more others of the aforementioned components are communicatively coupled to the device 102. Furthermore, although FIG. 1A illustrates a single VM 112 running a base OS 114 for a single invoked application 108-1, in other embodiments, multiple VMs 112 can be generated for multiple different invoked applications on multiple different base OSs. In other embodiments, multiple invoked applications can be implemented on a single base OS 114 generated by VM 112.

Figure 1B:
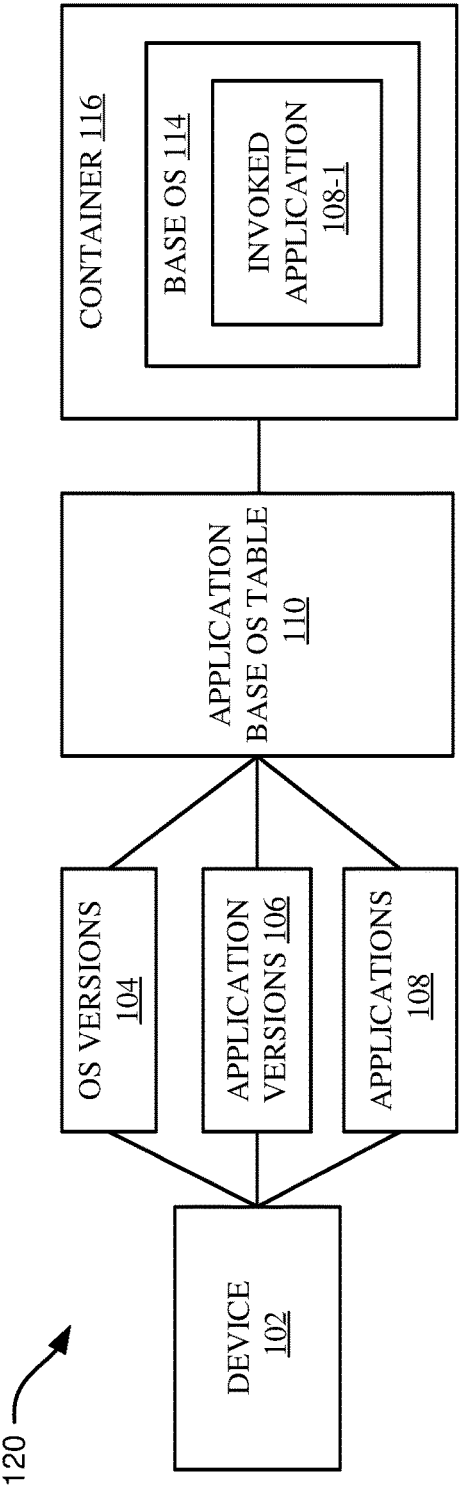
FIG. 1B illustrates a block diagram of a second example computational environment where an application is invoked on a predetermined OS of a container, in accordance with some embodiments of the present disclosure.

FIG. 1B illustrates a block diagram of a second example computational environment 120 where an application is invoked on a predetermined OS of a container, in accordance with some embodiments of the present disclosure. In FIG. 1B, device 102, OS versions 104, application versions 106, applications 108, application base OS table 110, base OS 114, and invoked application 108-1 can be consistent with their counterparts described above with respect to FIG. 1A. However, FIG. 1B differs from FIG. 1A insofar as FIG. 1B utilizes a container 116 rather than a VM 112 for generating the base OS 114 in isolation from another OS being utilized by the device 102.

In contrast to VMs, containers virtualize an OS without needing to virtualize the underlying computational components. Said another way, containers can sit on top of a physical server and its host OS. Rather than spinning up an entire VM, containers can package together everything needed to run a single application or microservice. The container can include all the code, its dependencies, and even the operating system itself. This can enable applications 108 to be relatively portable (e.g., a containerized application 108 can be implemented by a desktop computer, a traditional IT infrastructure, the cloud, etc.).

Regardless of whether a VM 112 or container 116 is implemented, aspects of the present disclosure include isolating the VM 112 or container 116 from other portions of the device 102. For example, networking settings or other security settings can be altered in the VM 112 or container 116 to increase security of the VM 112 or container 116 insofar as the VM 112 or container 116 may be deploying an insecure or outdated base OS 114. In some embodiments, the VM 112 or container 116 is deployed within, or the VM 112 or container 116 deploys the base OS 114 within, a sandbox.

FIG. 2A illustrates an example application base OS table 110A including two OS versions 104, in accordance with some embodiments of the present disclosure. In application base OS table 110A, OS versions 104 are correlated with different applications 108. For example, a version 1.9 OS (e.g., a most recent OS) is associated with application 1, application 2, application 3, and application 5. In contrast, a previous version 1.8 OS is associated with application 4. In some situations, a device 102 may be implementing version 1.9 OS when application 4 is invoked. In response, aspects of the present disclosure can query the application base OS table 110A and determine that version 1.8 OS is the base OS 114 for application 4. In response to determining that version 1.8 OS is the base OS 114 for application 4, aspects of the present disclosure can instantiate the base OS 114 in a VM 112 or container 116 and execute application 4 in the instantiated base OS 114. Advantageously, aspects of the present disclosure retain functionality of an application 108 that is otherwise incompatible with an updated OS version 104 by instantiating a compatible base OS 114 on which the application 108 can be invoked.

FIG. 2B illustrates an example application base OS table 110B including three OS versions 104, in accordance with some embodiments of the present disclosure. application base OS table 110B can represent an updated application base OS table 110B after a new OS version 104 is released (e.g., version 2.0 OS). In response to the newly released OS version 104, the application base OS table 110B can reevaluate the compatibility of different applications 108 with different OS versions 104. For example, in application base OS table 110B, application 2 and application 5 can be associated with version 2.0 OS, application 1 and application 3 can be associated with version 1.9 OS, and application 4 can be associated with version 1.8 OS.

The compatibility of applications 108 with OS versions 104 can be derived from a variety of sources. For example, a user can manually set a base OS 114 for respective applications 108. As another example, the base OS 114 can be based on historical data such as a most recent OS version 104 that has successfully executed an application 108. As yet another example, documentation associated with applications 108 can be queried (e.g., by using natural language processing (NLP) techniques) to determine compatibility between different applications 108 and OS versions 104.

FIG. 2C illustrates an example application base OS table 110C where applications 108 are ranked by preferred OS version 104, in accordance with some embodiments of the present disclosure. As shown in FIG. 2C, application 5 has a first preference for version 2.0 OS (APPS-1), a second preference for version 1.9 OS (APPS-2), and a third preference for version 1.8 OS (APPS-3). In contrast, application 4 has a preference for version 1.8 OS and no other versions (e.g., application 4 is incompatible with version 1.9 OS and version 2.0 OS). As another example, application 3 has an ordered preference for version 1.9 OS (APPS-1), version 1.8 OS (APP3-2), and no compatibility with version 2.0 OS. As yet another example, application 2 can have an ordered preference of version 1.9 OS (APP2-1), version 1.8 OS (APP2-2), and version 2.0 OS (APP2-3). Finally, application 1 has an ordered preference of version 1.9 OS (APP1-1), version 1.8 OS (APP1-2), and no compatibility with version 2.0 OS.

Preferential rankings as shown in application base OS table 110C can be manually defined or automatically configured. When automatically configured, the preferences can be established to improve efficiency, security, functionality, or another aspect. For example, in some embodiments, the order can be defined by a boot time (e.g., a boot time of the base OS 114 or a boot time of an application 108 on the base OS 114), where a shorter boot time can be ranked higher and a longer boot time can be ranked lower. As another example, the order can be defined by a memory occupancy (e.g., a memory occupancy of the base OS 114 or a memory occupancy of an application 108 in in the base OS 114), where a smaller memory occupancy can be associated with a higher rank and a larger memory occupancy can be associated with a lower rank.

Figure 3A:
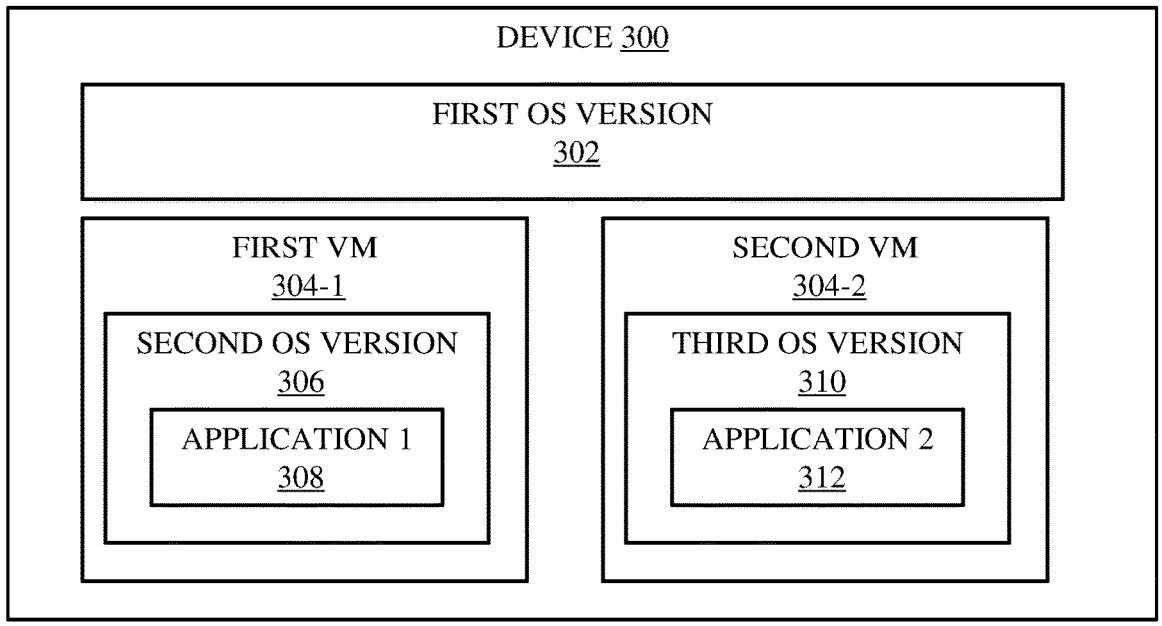
FIG. 3A illustrates a device executing multiple OS versions on multiple VMs, in accordance with some embodiments of the present disclosure.

FIG. 3A illustrates a device 300 executing multiple OS versions on multiple VMs, in accordance with some embodiments of the present disclosure. As shown, device 300 runs a first OS version 302. Further, device 300 utilizes a first VM 304-1 and a second VM 304-2. The first VM 304-1 runs a second OS version 306, where the second OS version 306 is a different version of, or a different type of, OS relative to the first OS version 302. Furthermore, a first application 308 is implemented in the second OS version 306 using the first VM 304-1.

Similarly, the second VM 304-2 runs a third OS version 310, where the third OS version 310 can be a different version of, or a different type of, OS relative to the second OS version 306 and/or the first OS version 302. A second application 312 can be implemented in the third OS version 310 using the second VM 304-2.

Figure 3B:
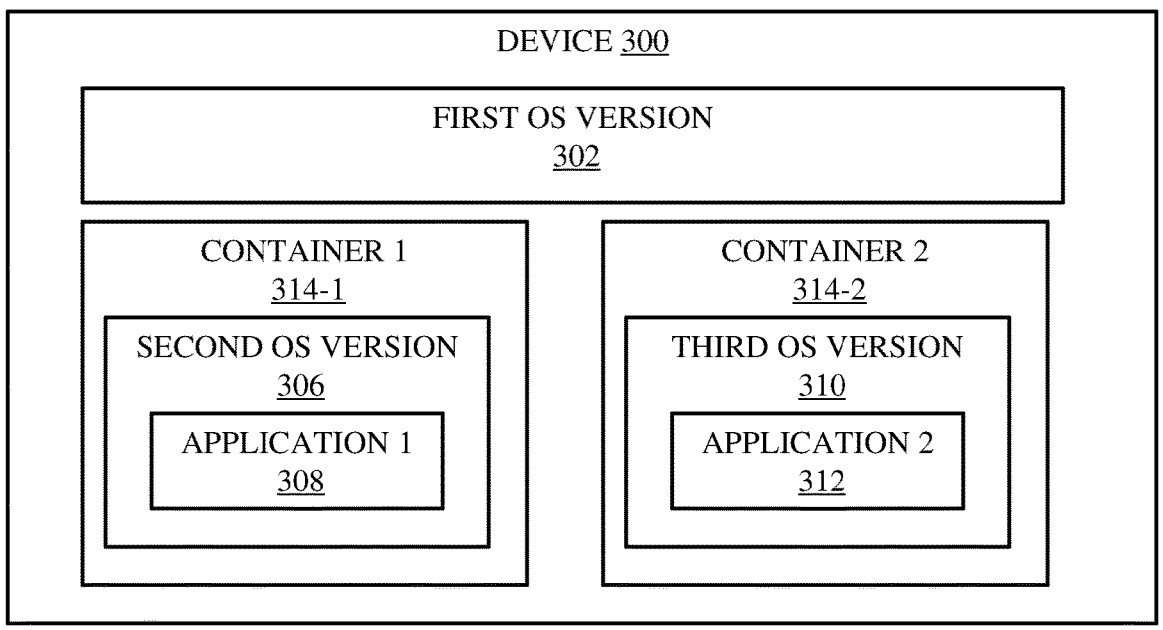
FIG. 3B illustrates a device executing multiple OS versions on multiple containers, in accordance with some embodiments of the present disclosure.

FIG. 3B illustrates a device 300 executing multiple OS versions on multiple containers, in accordance with some embodiments of the present disclosure. FIG. 3B is similar to FIG. 3A except that in FIG. 3B a first container 314-1 and a second container 314-2 run the first OS version 306 and the second OS version 310 to respectively invoke the first application 308 and the second application 312.

Both FIG. 3A and 3B realize advantages insofar as the first application 308 and the second application 312 can exhibit improved performance, efficiency, functionality, and/or compatibility by virtue of being implemented in a different OS version relative to an OS version running on the device 300. Whether different OS versions are realized in a VM (as with FIG. 3A) or a container (as with FIG. 3B) can realize a different subset of advantages. For example, VMs tend me be larger, more comprehensive, and more powerful than containers. In contrast, containers tend to be more portable, modular, and lightweight than VMs.

As shown in FIGS. 3A and 3B, the device 300 can be consistent with device 102 of FIG. 1. Furthermore, first OS version 302, second OS version 306, and third OS version 310 can be consistent with OS versions 104. Furthermore, first VM 304-1 and second VM 304-2 can be consistent with VM 112. Further still, first container 314-1 and second container 314-2 can be consistent with container 116. Finally, first application 308 and second application 312 can be consistent with invoked application 108-1.

Figure 4:
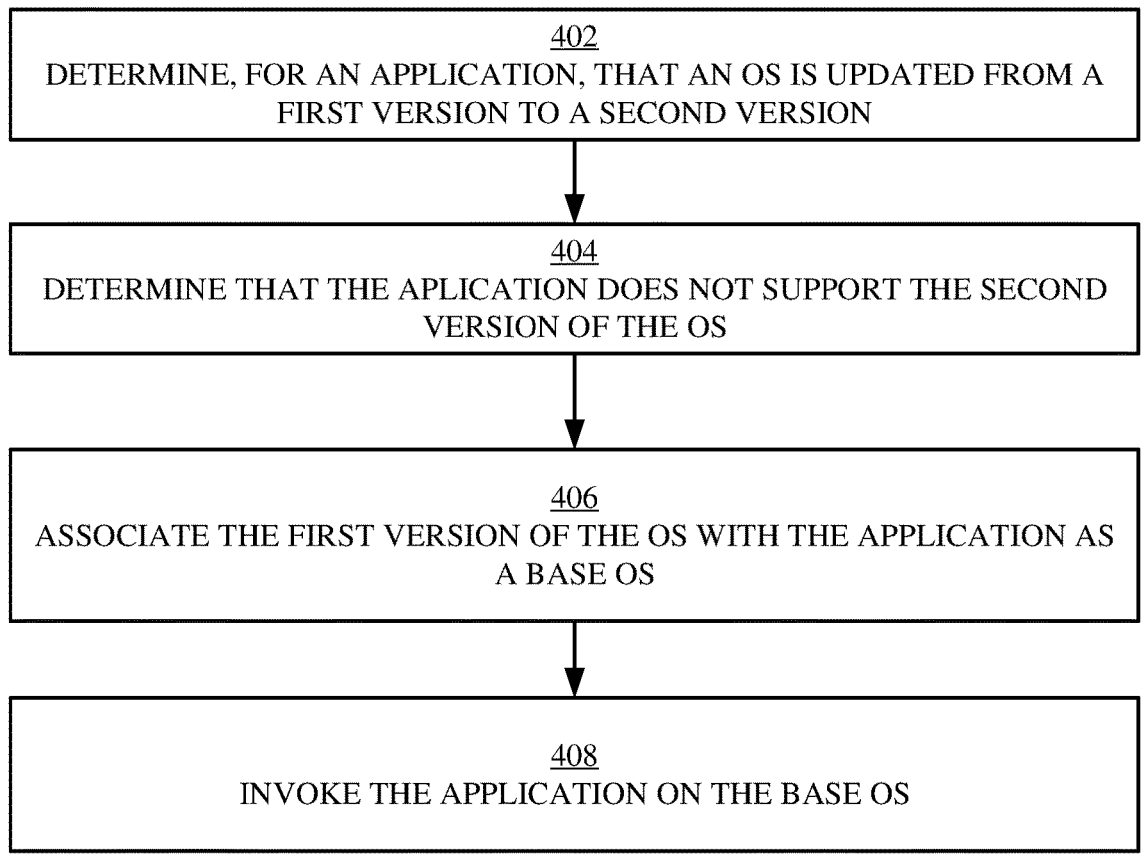
FIG. 4 illustrates a flowchart of an example method for invoking an application on a base OS, in accordance with some embodiments of the present disclosure.

FIG. 4 illustrates a flowchart of an example method 400 for invoking an application 108 on a base OS 114, in accordance with some embodiments of the present disclosure. In some embodiments, the method 400 is implemented by a computer, one or more processors, a device, or another configuration of hardware and/or software.

Operation 402 includes determining, for an application 108, that an OS is updated from a first version to a second version. Operation 404 includes determining that the application 108 does not support the second version of the OS. Operation 404 can determine compatibility between applications 108 and OS versions 104 by manual or automatic configurations. When automatically configured, aspects of the present disclosure can rely on execution history of various applications 108 on various OS versions 104 to differentiate compatible and incompatible OS versions 104 for respective applications 108. In some embodiments, aspects of the present disclosure use NLP on product documentation to determine compatibility of applications 108 with different OS versions 104.

Operation 406 includes associating the first version of the OS with the application 108 as a base OS 114. In some embodiments, the first version of the OS is associated with the application 108 in an application base OS table 110. In some embodiments, the first version of the OS is ranked above other compatible OS versions 104 based on, for example, a boot time or memory occupancy.

Operation 408 includes invoking the application 108 on the base OS 114. In some embodiments, operation 408 includes instantiating the base OS 114 in a VM 112 or container 116. In some embodiments, the base OS 114 supporting the invoked application 108-1 can be a different version of, or a different type of, OS relative to an OS of a device storing the invoked application 108-1.

Figure 5:
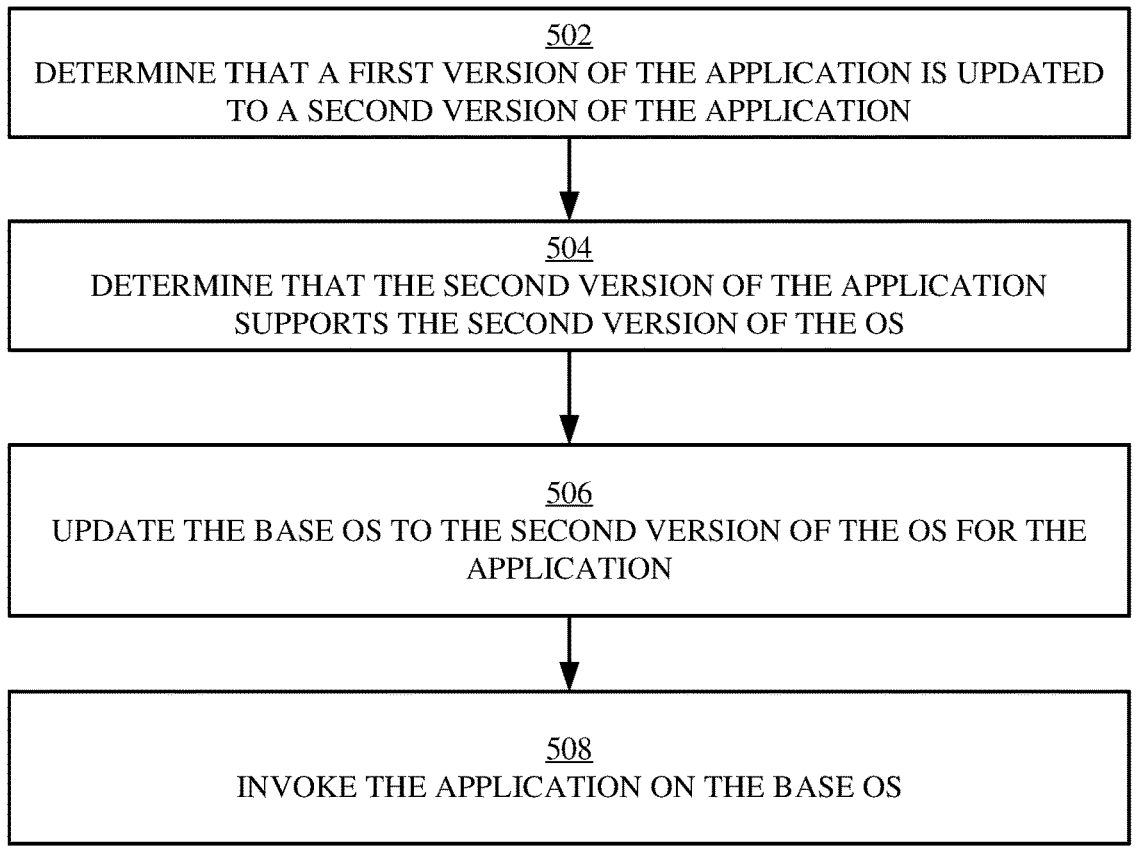
FIG. 5 illustrates a flowchart of an example method for invoking an application on an updated base OS based on an updated application version, in accordance with some embodiments of the present disclosure.

FIG. 5 illustrates a flowchart of an example method 500 for invoking an application 108 on an updated base OS 114 based on an updated application version 106, in accordance with some embodiments of the present disclosure. In some embodiments, the method 500 is implemented by a computer, one or more processors, a device, or another configuration of hardware and/or software. In some embodiments, the method 500 occurs after the method 400 of FIG. 4.

Operation 502 includes determining that a first version of the application 108 is updated to a second version of the application 108. Operation 504 includes determining that the second version of the application 108 supports the second version of the OS. In some embodiments, operation 504 determines that the second version of the application 108 supports the second version of the OS based on NLP of product documentation associated with the second version of the application 108. In other embodiments, operation 504 determines that the second version of the application 108 supports the second version of the OS based on a test invocation of the second version of the application 108 on the second version of the OS.

Operation 506 includes updating the base OS 114 to the second version of the OS for the application 108. In some embodiments, operation 506 updates the application base OS table 110 to reflect the second version of the OS as the base OS 114 for the application 108. Operation 508 includes invoking the application 108 on the updated base OS 114.

Figure 6:
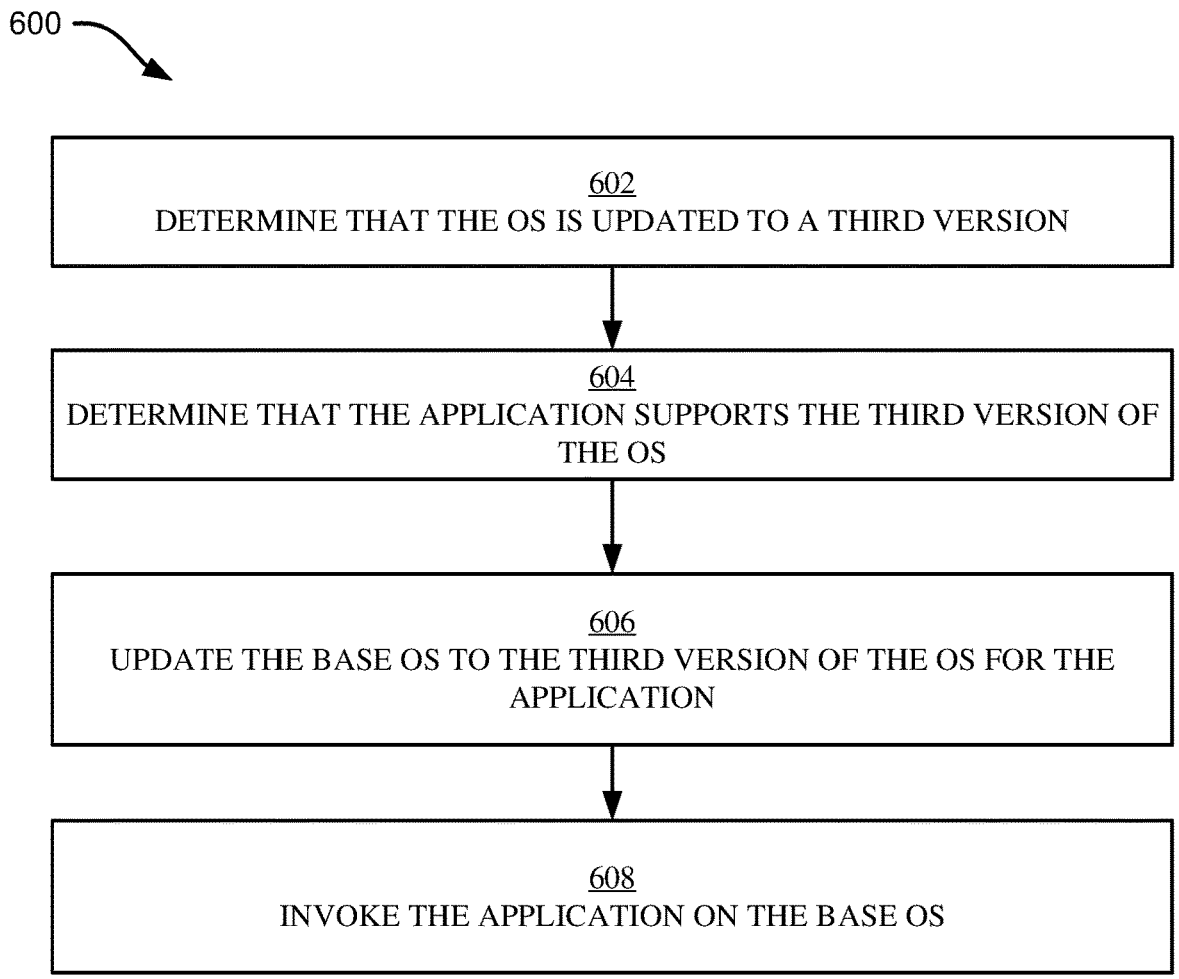
FIG. 6 illustrates a flowchart of an example method for invoking an application on an updated base OS based on an updated OS version, in accordance with some embodiments of the present disclosure.

FIG. 6 illustrates a flowchart of an example method 600 for invoking an application 108 on an updated base OS 114 based on an updated OS version 104, in accordance with some embodiments of the present disclosure. In some embodiments, the method 600 is implemented by a computer, one or more processors, a device, or another configuration of hardware and/or software. In some embodiments, the method 600 occurs after the method 400 of FIG. 4.

Operation 602 includes determining that an OS is updated from a second version to a third version. Operation 604 includes determining that the application 108 supports the third version of the OS. In some embodiments, operations 604 utilizes methodologies similar to those described with respect to operation 404 of FIG. 4 to determine compatibility between an application 108 and the third version of the OS.

Operation 606 includes updating the base OS 114 to the third version of the OS for the application 108. In some embodiments, operation 606 further updates an application base OS table 110 to associate the third version of the OS with the application 108. Operation 608 includes invoking the application 108 on the base OS 114.

Figure 7A:
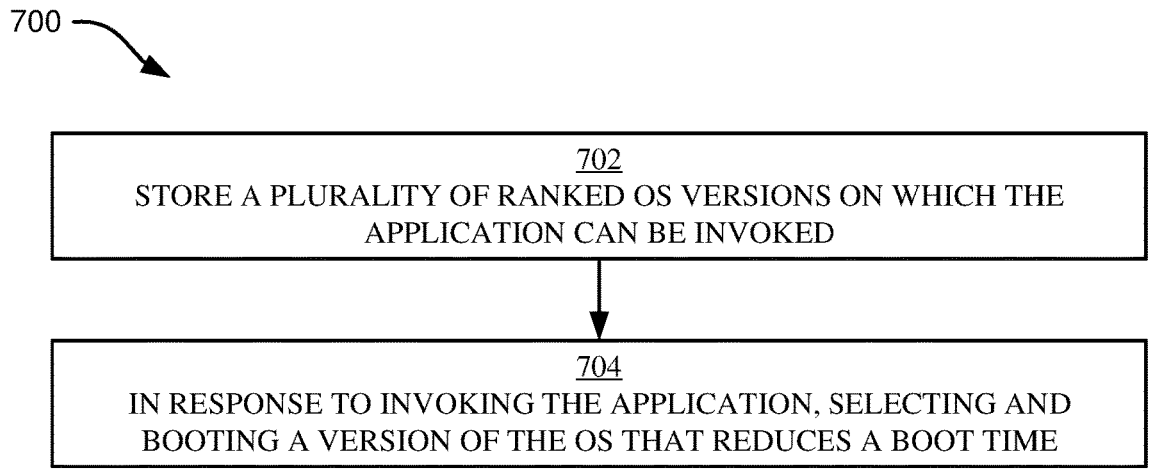
FIG. 7A illustrates a flowchart of an example method for invoking an application on a version of an OS that reduces a boot time, in accordance with some embodiments of the present disclosure.

FIG. 7A illustrates a flowchart of an example method 700 for invoking an application 108 on a version of an OS that reduces a boot time, in accordance with some embodiments of the present disclosure. In some embodiments, the method 700 is implemented by a computer, one or more processors, a device, or another configuration of hardware and/or software. In some embodiments, the method 700 is a sub-method of operation 408 of FIG. 4.

Operation 702 includes storing a plurality of ranked OS versions 104 on which an application 108 can be invoked (e.g., see application base OS table 110C of FIG. 2C). Operation 704 includes, in response to invoking the application 108, selecting and booting a version of the OS that reduces a boot time (e.g., reduces a boot time of the selected version of the OS, and/or reduces a boot time of the application 108 on the selected version of the OS). Advantageously, selecting a version of the OS that reduces a boot time improves a computational efficiency of the device 102.

Figure 7B:
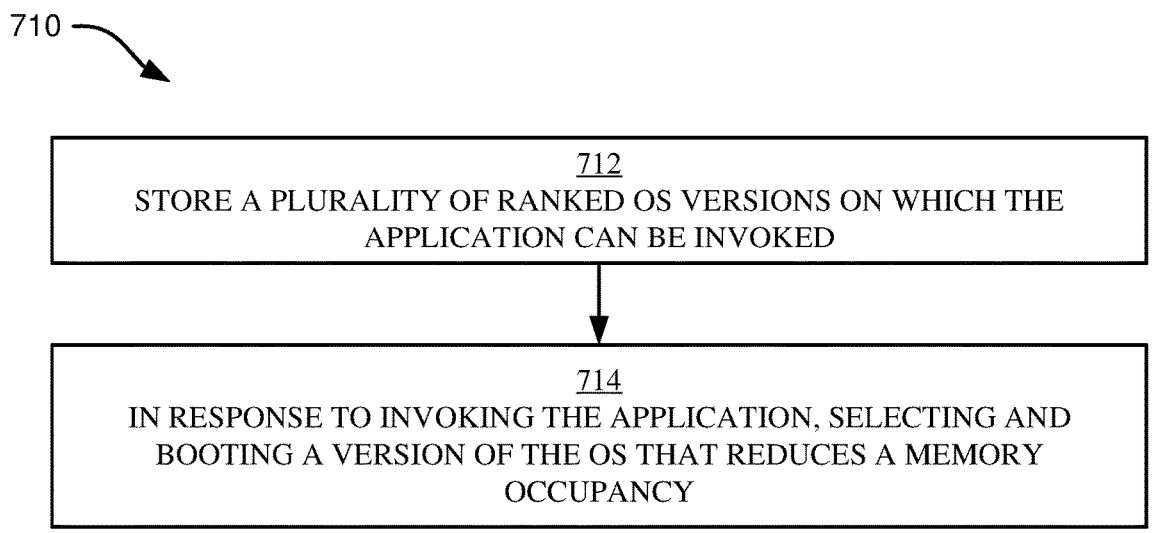
FIG. 7B illustrates a flowchart of an example method for invoking an application on a version of an OS that reduces a memory occupancy, in accordance with some embodiments of the present disclosure.

FIG. 7B illustrates a flowchart of an example method 710 for invoking an application 108 on a version of an OS that reduces a memory occupancy, in accordance with some embodiments of the present disclosure. In some embodiments, the method 710 is implemented by a computer, one or more processors, a device, or another configuration of hardware and/or software. In some embodiments, the method 710 is a sub-method of operation 408 of FIG. 4.

Operation 712 includes storing a plurality of ranked OS versions 104 on which an application can be invoked (e.g., see application base OS table 110C of FIG. 2C). Operation 714 includes, in response to invoking the application 108, selecting and booting a version of the OS that reduces a memory occupancy (e.g., reduces a memory occupancy of the selected version of the OS and/or reduces a memory occupancy of the application 108 on the selected version of the OS). Advantageously, selecting a version of the OS that reduces a memory occupancy improves a computational efficiency of the device 102.

Figure 8:
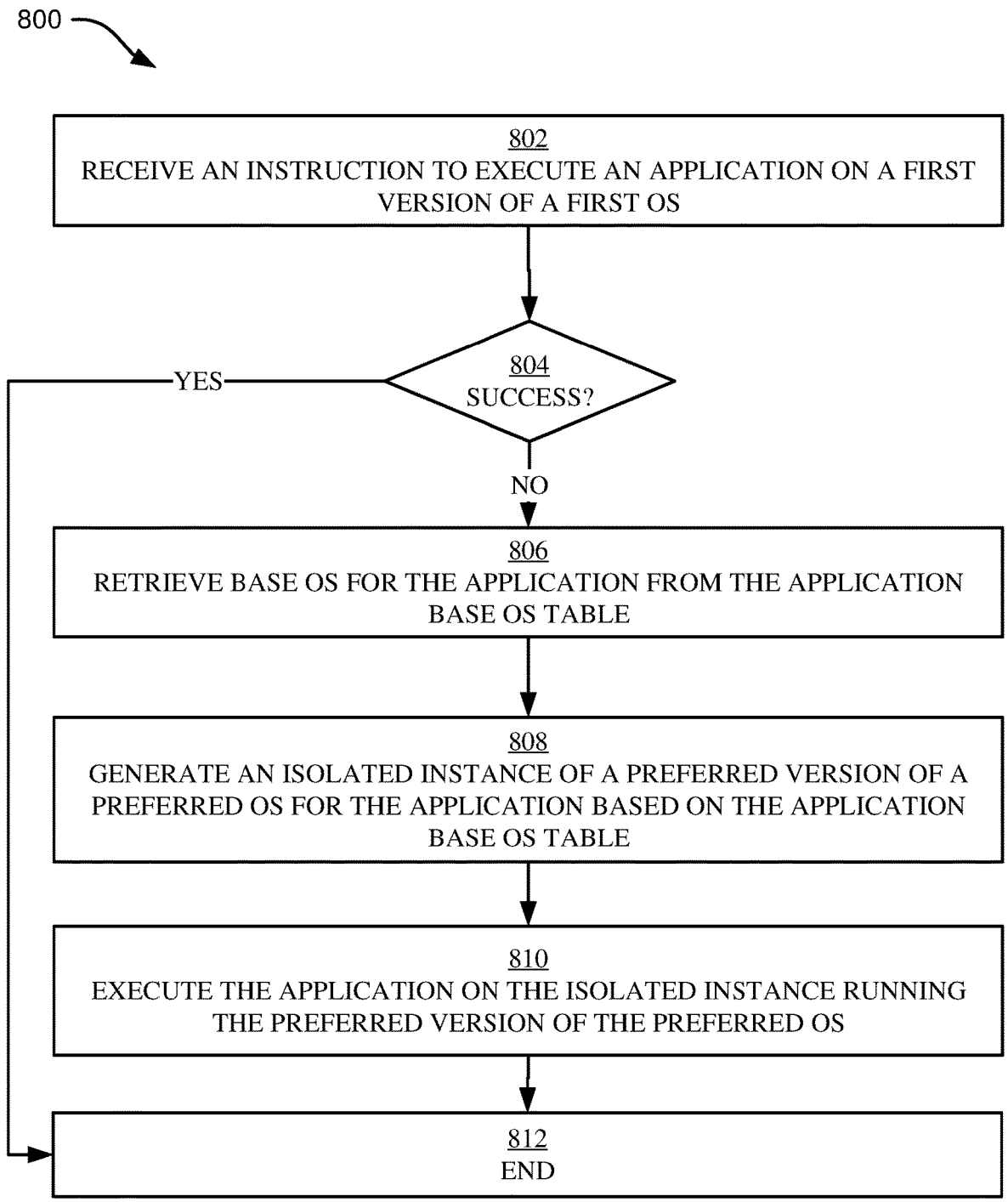
FIG. 8 illustrates a flowchart of an example method for executing an application on an isolated instance of a preferred version of a preferred OS, in accordance with some embodiments of the present disclosure.

FIG. 8 illustrates a flowchart of an example method 800 for executing an application 108 on an isolated instance of a preferred version of a preferred OS, in accordance with some embodiments of the present disclosure. In some embodiments, the method 800 is implemented by a computer, one or more processors, a device, or another configuration of hardware and/or software.

Operation 802 includes receiving an instruction to execute an application 108 on a first version of a first OS. In some embodiments, the instruction is received from a device 102. Operation 804 includes determining if executing the application 108 on the first version of the first OS is successful. If so (804: YES), the method 800 ends at operation 812. If not (804: NO), the method 800 proceeds to operation 806 and retrieves a base OS 114 for the application 108 from the application base OS table 110. In some embodiments, the base OS 114 is a version or type of OS that is compatible with application 108. In situations where multiple versions and/or types of OS are compatible with application 108, aspects of the present disclosure can rank the multiple versions and/or types of OS by performance metrics such as boot times, memory occupancies, and/or other metrics.

Operation 808 includes generating an isolated instance of a preferred version of a preferred OS for the application 108 based on the application base OS table 110. In some embodiments, the isolated instance can be distinct from a version and/or type of OS otherwise executing on the device 102. In some embodiments, the isolated instance is a VM 112 while in other embodiments the isolated instance is a container 116. In some embodiments, the isolated instance is isolated in a sandbox of the device 102 (or in a sandbox of computational resources virtually provisioned to the device 102 via a network).

Operation 810 includes executing the application 108 on the isolated instance running the preferred version of the preferred OS. The method 800 then ends at operation 812.

Figure 9:
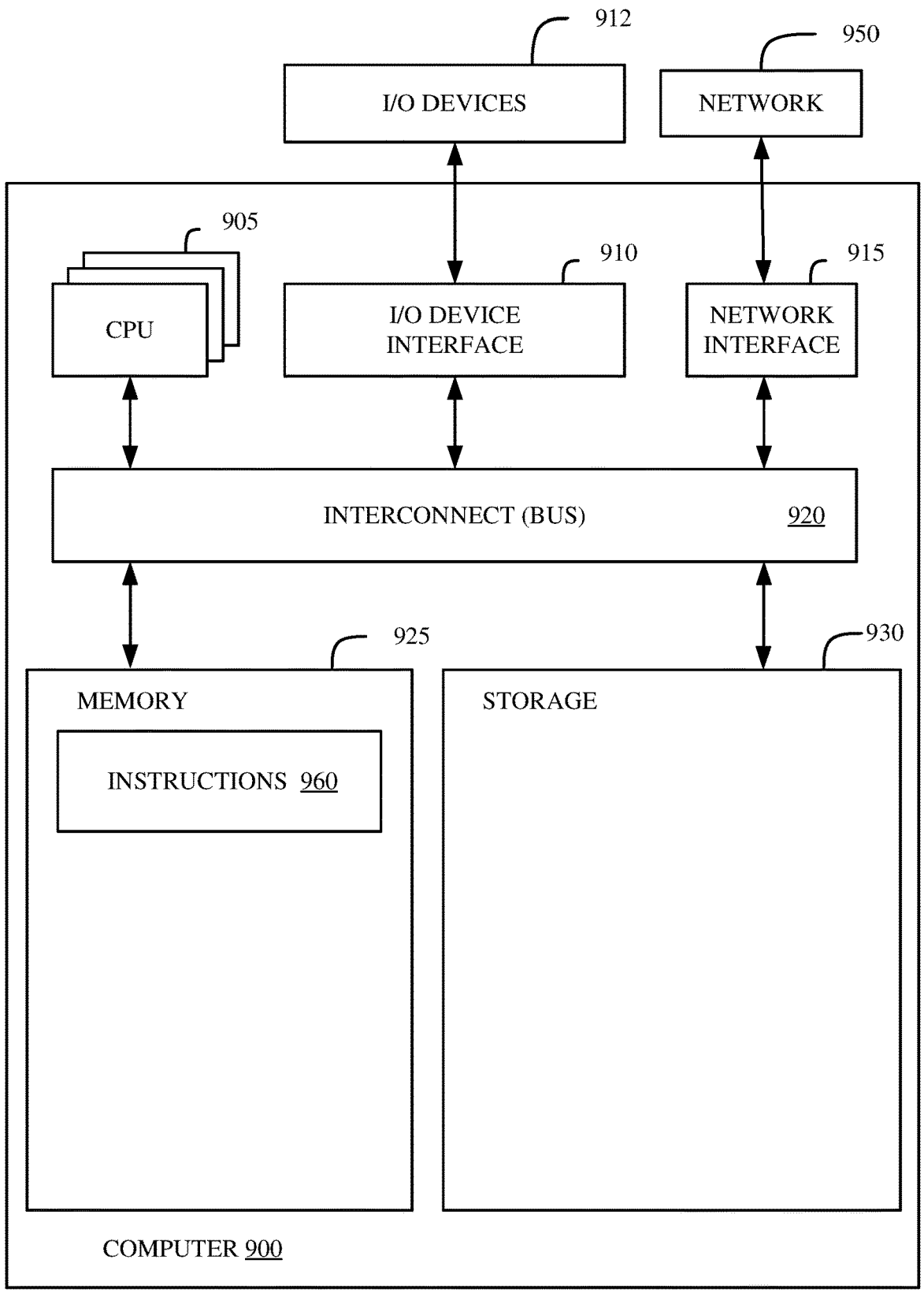
FIG. 9 illustrates a block diagram of an example computer, in accordance with some embodiments of the present disclosure.

FIG. 9 illustrates a block diagram of an example computer 900 in accordance with some embodiments of the present disclosure. In various embodiments, computer 900 can perform any or all portions of the method described in FIGS. 4-8 and/or implement the functionality discussed in FIGS. 1A-1B, 2A-2C, and/or 3A-3B. In some embodiments, computer 900 receives instructions related to the aforementioned methods and functionalities by downloading processor-executable instructions from a remote data processing system via network 950. In other embodiments, computer 900 provides instructions for the aforementioned methods and/or functionalities to a client machine such that the client machine executes the method, or a portion of the method, based on the instructions provided by computer 900. In some embodiments, the computer 900 is incorporated into (or functionality similar to computer 900 is virtually provisioned to) one or more entities illustrated in FIGS. 1A-1B, FIGS. 3A-3B, and/or other aspects of the present disclosure.

Computer 900 includes memory 925, storage 930, interconnect 920 (e.g., a bus), one or more CPUs 905 (also referred to as processors herein), I/O device interface 910, I/O devices 912, and network interface 915.

Each CPU 905 retrieves and executes programming instructions stored in memory 925 or storage 930. Interconnect 920 is used to move data, such as programming instructions, between the CPUs 905, I/O device interface 910, storage 930, network interface 915, and memory 925. Interconnect 920 can be implemented using one or more buses. CPUs 905 can be a single CPU, multiple CPUs, or a single CPU having multiple processing cores in various embodiments. In some embodiments, CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random-access memory (e.g., static random-access memory (SRAM), dynamic random-access memory (DRAM), or Flash). Storage 930 is generally included to be representative of a non-volatile memory, such as a hard disk drive, solid state device (SSD), removable memory cards, optical storage, or flash memory devices. In an alternative embodiment, storage 930 can be replaced by storage area-network (SAN) devices, the cloud, or other devices connected to computer 900 via I/O device interface 910 or network 950 via network interface 915.

In some embodiments, memory 925 stores instructions 960. However, in various embodiments, instructions 960 are stored partially in memory 925 and partially in storage 930, or they are stored entirely in memory 925 or entirely in storage 930, or they are accessed over network 950 via network interface 915.

Instructions 960 can be computer-readable and computer-executable instructions for performing any portion of, or all of, the method of FIGS. 4-8 and/or implement the functionality discussed in FIGS. 1A-1B, 2A-2C, and/or 3A-3B. Although instructions 960 are shown in memory 925, instructions 960 can include program instructions collectively stored across numerous computer-readable storage media and executable by one or more CPUs 905.

In various embodiments, I/O devices 912 include an interface capable of presenting information and receiving input. For example, I/O devices 912 can present information to a user interacting with computer 900 and receive input from the user.

Computer 900 is connected to network 950 via network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
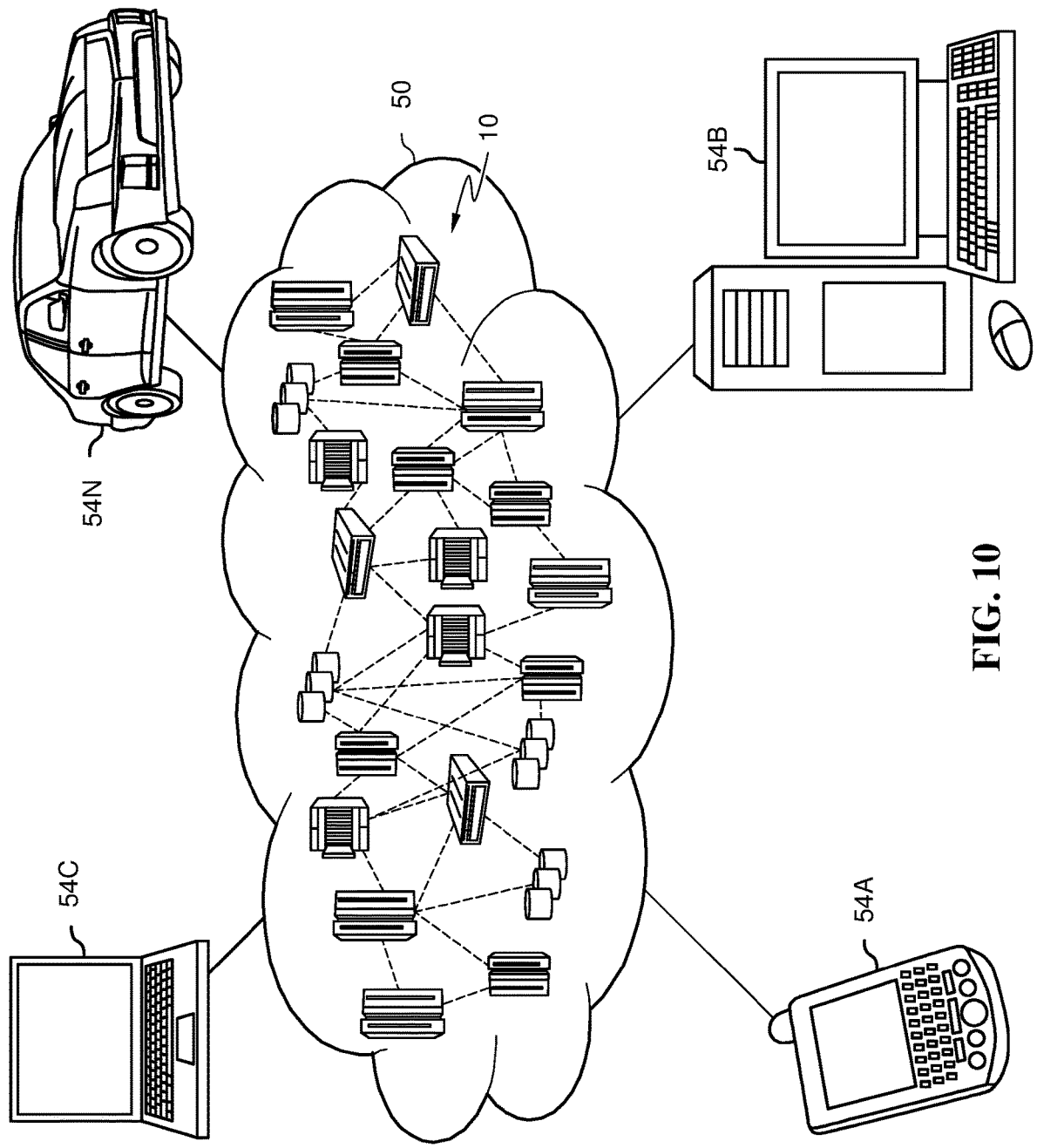
FIG. 10 depicts a cloud computing environment, in accordance with some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
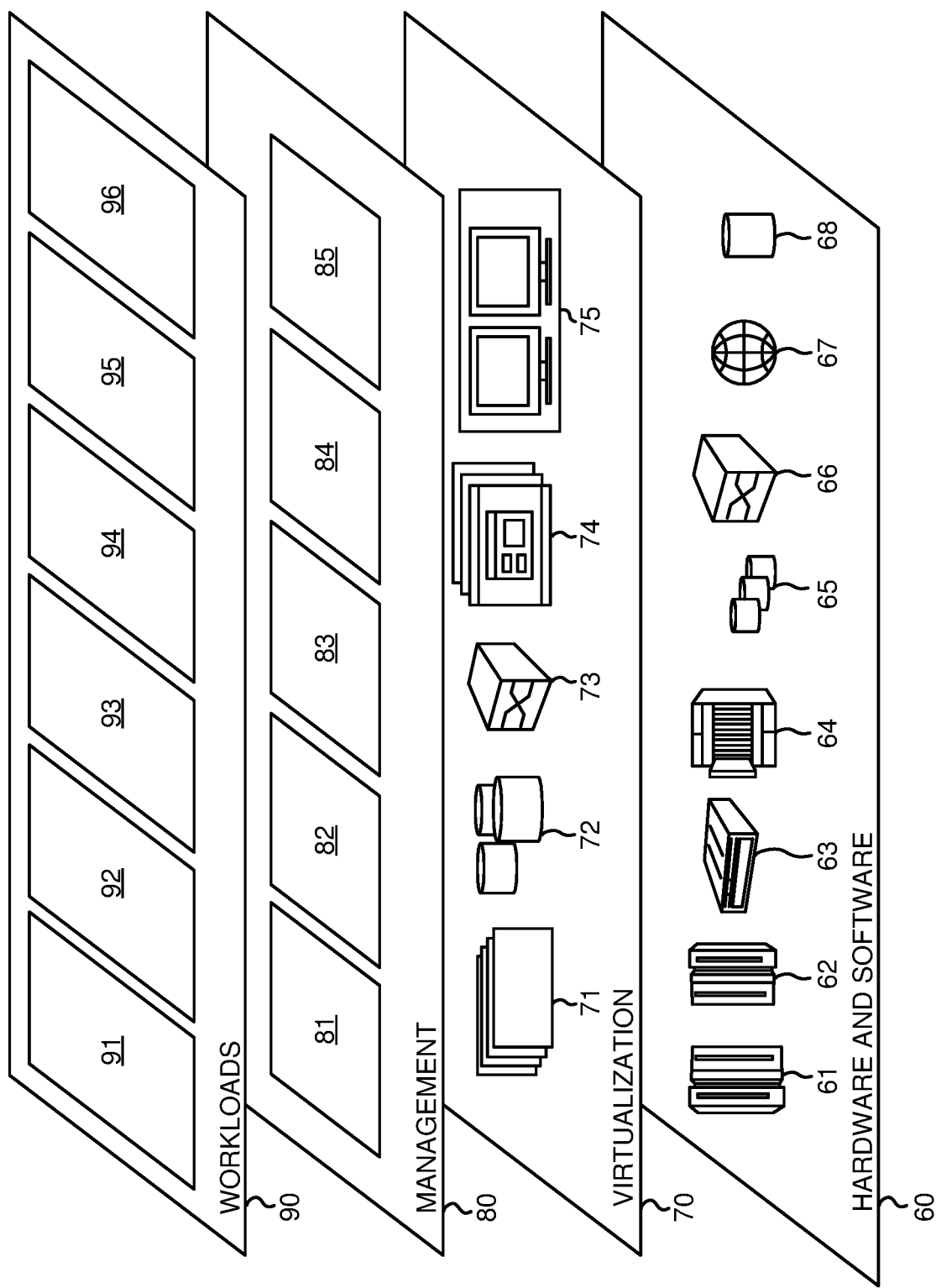
FIG. 11 depicts abstraction model layers, in accordance with some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application invocation on a specified operating system (OS) version 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any portion of the method described with respect to FIGS. 4-8 and/or implement the functionality discussed in FIGS. 1A-1B, 2A-2C, and/or 3A-3B can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes determining that a first version of an operating system (OS) is updated to a second version of the OS; determining that an application does not support the second version of the OS; associating the first version of the OS with the application as a base OS; and invoking the application on the base OS by generating an isolated instance running the base OS on a user device, wherein the user device simultaneously runs the second version of the OS.

Example 2 includes the method of example 1, including or excluding optional features. In this example, the first version of the OS and the second version of the OS are different versions of a same OS.

Example 3 includes the method of example 1, including or excluding optional features. In this example, the first version of the OS and the second version of the OS are different types of OS.

Example 4 includes the method of any one of examples 1 to 3, including or excluding optional features. In this example, the method includes determining that a first version of the application is updated to a second version of the application; determining that the second version of the application supports the second version of the OS; updating the base OS to the second version of the OS for the application; and invoking the application on the base OS by executing the application on the second version of the OS running on the user device.

Example 5 includes the method of any one of examples 1 to 4, including or excluding optional features. In this example, the method includes storing a plurality of versions of the OS on which the application can be invoked; and in response to invoking the application, selecting and booting a version of the OS that reduces a boot time.

Example 6 includes the method of any one of examples 1 to 4, including or excluding optional features. In this example, the method includes storing a plurality of versions of the OS on which the application can be invoked; and in response to invoking the application, selecting and booting a version of the OS that reduces a memory occupancy.

Example 7 includes the method of any one of examples 1 to 6, including or excluding optional features. In this example, the isolated instance running the base OS is a virtual machine (VM). Optionally, the isolated instance running the base OS is a sandbox of the VM.

Example 8 includes the method of any one of examples 1 to 6, including or excluding optional features. In this example, the isolated instance running the base OS is a container.

Example 9 includes the method of any one of examples 1 to 8, including or excluding optional features. In this example, a base OS table stores relationships between a plurality of applications and a plurality of versions of the OS.

Example 10 includes the method of any one of examples 1 to 9, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 11 is a system. The system includes a user device comprising hardware executing software on a first operating system (OS); a first isolated instantiation of a second OS, wherein the first isolated instantiation of the second OS invokes a first application, wherein the first application does not function on the first OS; and a second isolated instantiation of a third OS, wherein the second isolated instantiation of the third OS invokes a second application, wherein the second application realizes an improved efficiency on the third OS relative to the first OS.

Example 12 includes the system of example 11, including or excluding optional features. In this example, the first isolated instantiation is a first virtual machine, and wherein the second isolated instantiation is a second virtual machine.

Example 13 includes the system of examples 11, including or excluding optional features. In this example, the first isolated instantiation is a first container, and wherein the second isolated instantiation is a second container.

Example 14 includes the system of any one of examples 11 to 13, including or excluding optional features. In this example, the improved efficiency comprises a reduced boot time of the third OS relative to the first OS.

Example 15 includes the system of any one of examples 11 to 13, including or excluding optional features. In this example, the improved efficiency comprises a reduced memory occupancy of the second application on the third OS relative to the first OS.

Example 16 includes the system of any one of examples 11 to 15, including or excluding optional features. In this example, at least two OS are different versions of a same OS, wherein the at least two OS are selected from a group consisting of: the first OS, the second OS, and the third OS.

Example 17 includes the system of any one of examples 11 to 15, including or excluding optional features. In this example, at least two OS are different types of OS, wherein the at least two OS are selected from a group consisting of: the first OS, the second OS, and the third OS.

Example 18 is a computer-implemented method. The method includes retrieving, based on an instruction to execute a first application on a user device, a preferred version of a first operating system (OS) for the first application from an application base OS table, wherein the user device executes a first version of the first OS; generating an isolated instance of the preferred version of the first OS on the user device; and executing the first application on the isolated instance of the preferred version of the first OS on the user device.

Example 19 is a system. The system includes one or more processors and one or more computer-readable storage media storing program instructions which, when executed by the one or more processors, are configured to cause the one or more processors to perform a method according to any one of examples 1 to 10 or 18.

Example 20 is a computer program product. The computer program product includes one or more computer readable storage media, and program instructions collectively stored on the one or more computer readable storage media, the program instructions comprising instructions configured to cause one or more processors to perform a method according to any one of examples 1 to 10 or 18.

What is claimed is:

1. A computer-implemented method comprising:
   updating a first version of an operating system (OS) to a second version of the OS, wherein a first version of an application does not support the second version of the OS;
   associating the first version of the OS with the first version of the application as a base OS;
   invoking the first version of the application on the base OS by generating an isolated instance running the base OS on a user device, wherein the user device simultaneously runs the second version of the OS;
   updating the first version of the application to a second version of the application, wherein the second version of the application supports the second version of the OS;
   updating the base OS to the second version of the OS for the second version of the application; and
   invoking the second version of the application on the base OS by executing the second version of the application on the second version of the OS running on the user device.

2. The method of claim 1, wherein the first version of the OS and the second version of the OS are different versions of a same OS.

3. The method of claim 1, wherein the first version of the OS and the second version of the OS are different types of OS.

4. The method of claim 1 further comprising:
   storing a plurality of versions of the OS on which the application to be invoked; and
   in response to invoking the application, selecting and booting a version of the OS that reduces a boot time.

5. The method of claim 1 further comprising:
   storing a plurality of versions of the OS on which the application to be invoked; and
   in response to invoking the application, selecting and booting a version of the OS that reduces a memory occupancy.

6. The method of claim 1, wherein the isolated instance running the base OS is a virtual machine (VM).

7. The method of claim 6, wherein the isolated instance running the base OS is a sandbox of the VM.

8. The method of claim 1, wherein the isolated instance running the base OS is a container.

9. The method of claim 1, wherein a base OS table stores relationships between a plurality of applications and a plurality of versions of the OS.

10. The method of claim 1, wherein the method is performed by one or more computers according to software that is downloaded to the one or more computers from a remote data processing system.

11. The method of claim 10, wherein the method further comprises:
    metering a usage of the software; and
    generating an invoice based on metering the usage.

12. A system comprising:
    a user device comprising hardware executing software on a first operating system (OS);
    a first isolated instantiation of a second OS, wherein the first isolated instantiation of the second OS invokes a first application, wherein the first application does not function on the first OS; and a second isolated instantiation of a third OS, wherein the second isolated instantiation of the third OS invokes a second application, wherein the second application realizes an improved efficiency on the third OS relative to the first OS, wherein the improved efficiency comprises a reduced memory occupancy of the second application on the third OS relative to the first OS.

13. The system of claim 12, wherein the first isolated instantiation is a first virtual machine, and wherein the second isolated instantiation is a second virtual machine.

14. The system of claim 12, wherein the first isolated instantiation is a first container, and wherein the second isolated instantiation is a second container.

15. The system of claim 12, wherein the improved efficiency comprises a reduced boot time of the third OS relative to the first OS.

16. The system of claim 12, wherein at least two OS are different versions of a same OS, wherein the at least two OS are selected from a group consisting of: the first OS, the second OS, and the third OS.

17. The system of claim 12, wherein at least two OS are different types of OS, wherein the at least two OS are selected from a group consisting of: the first OS, the second OS, and the third OS.

18. A computer-implemented method comprising:
retrieving, based on an instruction to execute a first application on a user device, a preferred version of a first operating system (OS) for the first application from an application base OS table, wherein the user device executes a first version of the first OS;
generating an isolated instance of the preferred version of the first OS on the user device; and
executing the first application on the isolated instance of the preferred version of the first OS on the user device, wherein the first application realizes a reduced memory occupancy of the first application on the preferred version of the first OS relative to the first version of the first OS.

* * * * *